United States Patent Office.

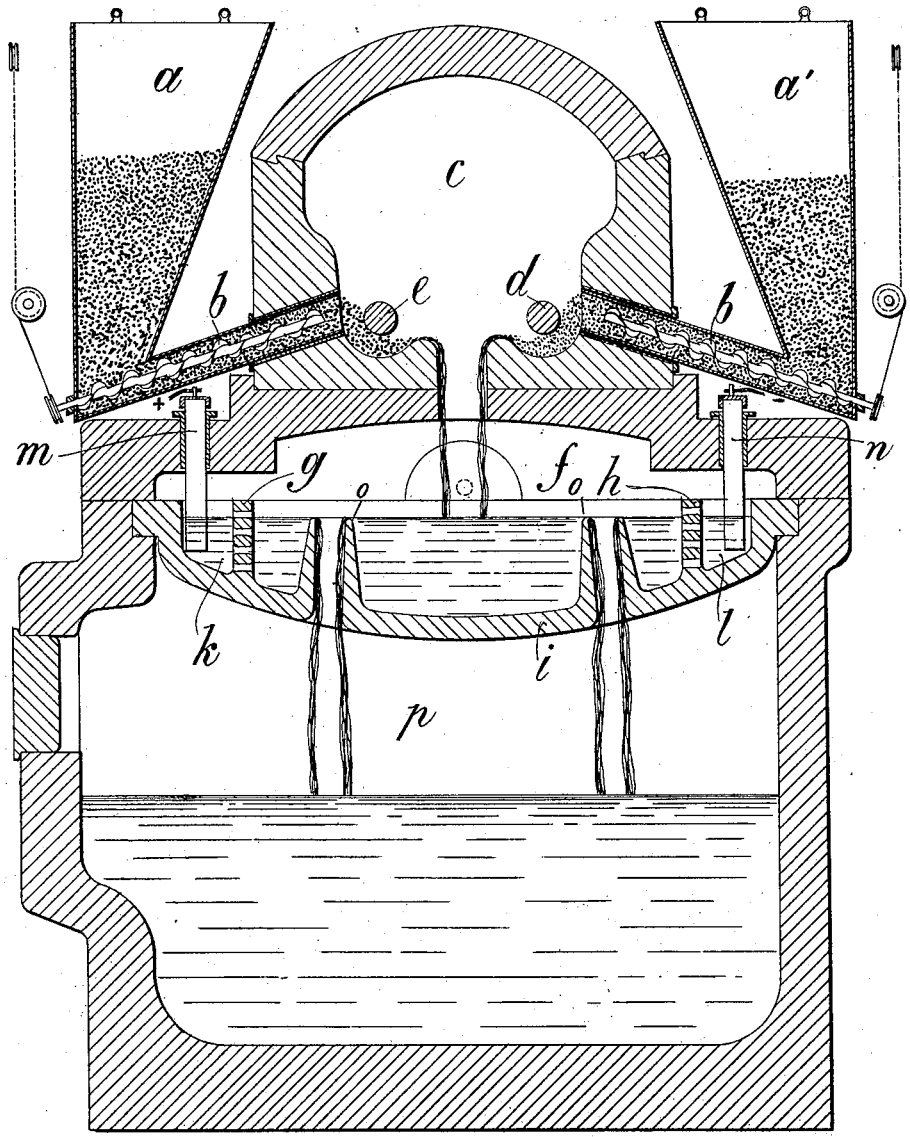

AUGUST VOELKER, OF EHRENFELD, GERMANY.

PROCESS OF MANUFACTURING GLASS.

SPECIFICATION forming part of Letters Patent No. 698,766, dated April 29, 1902.

Application filed September 27, 1900. Serial No. 31,311. (No specimens.)

*To all whom it may concern:*

Be it known that I, AUGUST VOELKER, a subject of the King of Prussia, Emperor of Germany, residing at Ehrenfeld, in the Kingdom of Prussia and German Empire, have invented certain new and useful Improvements in Processes of Manufacturing Glass, (for which I have applied for patents in England, dated July 13, 1900; in Germany, dated June 27, 1900; in Austria, dated July 13, 1900, and in Switzerland, dated July 14, 1900,) of which the following is a specification.

The reducing fusion of difficultly-fusible materials (ores, metallic oxids, and the like) by means of the electric current has been effected, with the exception of certain special cases, such as the raw materials for glass and calcium carbid, in one of two ways. Either the substance to be fused has been used as a resistance in the circuit, in which case it forms itself the resistance or is in intimate contact with another resistant material, or the substance to be fused is introduced between the poles of an electric arc and is heated by the arc itself. The second method, which considerably exceeds the first in intensity, has already been used for melting the raw materials in the manufacture of glass. While heating by means of the arc itself has the advantage that the substance is heated very rapidly to a high temperature, so that immediate fusion follows, on the other hand the so-called "resistance heating" affords a simple and sure mode of working, so that its application to the manufacture of glass has much to recommend it.

This invention relates to an improvement in the manufacture of glass by electrical heating, which consists in clearing the molten mass—that is to say, in removing the air bubbles therefrom—by converting it into an electrical resistance after it has been melted by the arc. In this manner the clearing process may be hastened.

The process is as follows: After the raw materials have been fused in the electric arc, in a crucible, or the like in the known manner the molten mass is poured or allowed to flow into a tank or chamber, and into it is introduced a pair of electrodes, by means of which a strong electric current is passed through the melted mass, which is a feeble conductor in the first instance or becomes a conductor of the second class. By this means, according to the strength of the current, a more or less powerful but steady and uniform heating of the mass of glass is effected, so that the latter becomes mobile, and the gas and air bubbles in it are able to rise and escape easily. This clearing process is of very short duration, and the uniformity of the heating is of essential importance to the product.

The accompanying drawing shows in vertical section a furnace adapted for this invention.

The hoppers $a\ a'$, containing the raw material for making the glass, communicate with the fusion-chamber $c$ through upwardly-sloping passages containing the conveyers $b$. In the chamber $c$, which is constructed of fireproof material, such as chamotte, are provided the electrodes $d\ e$, one between each inlet for the raw material and the outlet for the same. Under the chamber $c$ is arranged the refining-pot $f$, which is also constructed of fireproof material. In this pot $f$ are provided perforated partitions-walls $g\ h$, preferably of chamotte stone, forming compartments $k\ l$, in each of which dips an electrode $m\ n$, preferably of carbon. Rising from the bottom of this refining-pot there are one or more overflow-pipes $o$, open at the top. A basin $p$ is provided under the refining-pot to collect the molten glass.

The raw materials for making the glass are fed continuously by means of the conveyers $b$ into the chambers $c$ from the hoppers $a$. Because the materials are discharged into the furnace from below and at the sides thereof between the carbon electrodes $d\ e$ and the furnace-walls, as shown in the drawing, it is possible to avoid contaminating the glass in the refining-pot $f$ with dust, and at the same time the walls of the furnace are protected from the intense heat of the electric arc, since this never strikes upon the walls themselves, but always on the raw material which lines them.

The electric arc between the electrodes $d\ e$ thoroughly melts the materials. The molten glass flows from the fusion-chamber into the refining-pot $f$ into which the electrode plates or bundles $m\ n$ of suitable dimensions. A strong electric current is supplied to these electrodes, and the glass thus clarified flows down the overflow-pipes o into the basin p.

The reason for not introducing the electrodes directly into the main tank i is that the contamination and coloration of the glass by particles from the electrodes may be avoided.

The strength of the current required depends on the size of the furnace and on the composition of the material in question. It may, however, be assumed that five amperes for each square millimeter of electrode-surface is a fair maximum.

What I claim, and desire to secure by Letters Patent of the United States, is—

A process of manufacturing glass by electrical heating which consists in first melting the raw materials in the electric arc and then passing an electric current through the crude molten glass such current being sufficiently strong to heat the molten glass to a temperature at which entangled gas-bubbles can readily escape from it, substantially as described.

In testimony whereof I have hereunto set my hand in the presence of two witnesses.

AUGUST VOELKER.

Witnesses:
CHARLES LE SUISPLE,
KARL SCHMITT.